June 30, 1959  W. B. TEMPLETON  2,892,328
COUPLING
Filed June 23, 1958

INVENTOR.
WILLIAM B. TEMPLETON.
BY
*Wallace P. Lamb*
ATTORNEY.

United States Patent Office 2,892,328
Patented June 30, 1959

2,892,328

COUPLING

William B. Templeton, Northville, Mich., assignor to Burroughs Corporation, Detroit, Mich., a corporation of Michigan Application June 23, 1958, Serial No. 743,744

4 Claims. (Cl. 64—14)

This invention relates generally to drive shaft components and particularly to a coupling therefor.

In machines of the character that require a great many sudden starting and stopping operations, breakage of the machine drive shafts has become more prevalent as loads and speed of operations have increased. The repeated stopping of the drive shaft, each cycle of operation against the momentum of the load, causes the drive shaft to sheer as the diameter of these shafts is limited by considerations of weight and clearances. The conventional coupling for shaft components has a yieldable connection, usually a rubber pad, but I have found such connectors undesirable for the drive shafts of high speed quick starting and stopping machines since a positive drive connection is requisite to proper and rapid operations. That is, if an ordinary yieldable coupling is used, it will yield on starting of the driving component and allow an undesirable time lag in rotation of the driven component behind the driving component.

Accordingly, it is the principal object of my invention to provide for drive shaft components, an improved resilient or flexible coupling having a positive drive connection between the components.

More specifically, it is an object of the invention to provide an improved resilient driving shaft coupling that will yield only upon stopping of the shaft power drive means.

Other objects of the invention will become apparent from the following description, taken in connection with the accompanying drawing in which.

Figure 1:
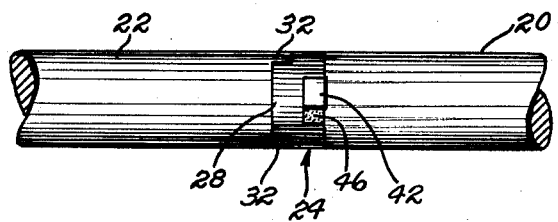
Fig. 1 is an elevational view of a pair of driving shaft components and my improved coupling therefor.

Referring to the drawing by characters of reference, there is shown a shaft having a driving component 20 and a driven component 22 connected together by my improved coupling, designated generally by the numeral 24. The coupling 24 is interposed between substantially aligned ends of the shaft components 20, 22 and comprises a driving coupling member 26 and a driven coupling member 28. Preferably, the driven member 28 of the coupling 24 is cylindrical having one end thereof formed with clutch teeth 30 to mesh with and engage similar teeth 32 on the corresponding end of the driven shaft component 22. The other end of the coupling member 28 is bifurcated, such as by cutting a slot 34 therethrough transversely to the axis of rotation of the member, providing opposed spaced walls 36 that are preferably equally spaced on opposite sides of the axis of rotation in the shaft components.

Figure 2:
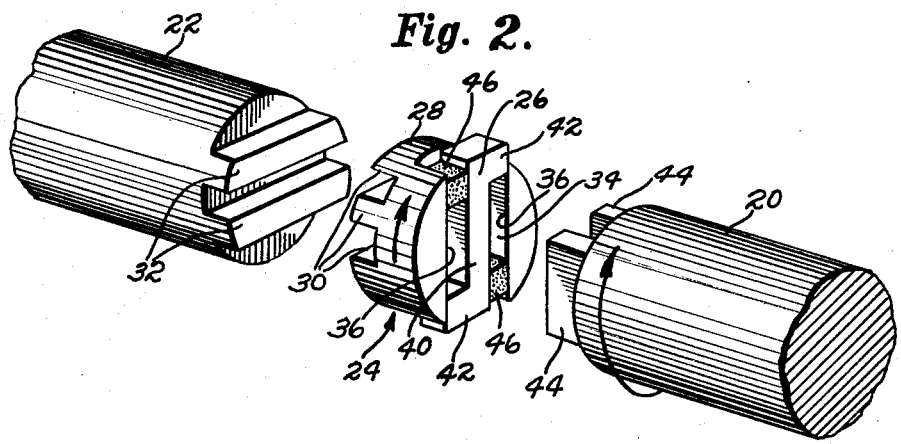
Fig. 2 is an exploded perspective view of the shaft and coupling components.
Figure 3:
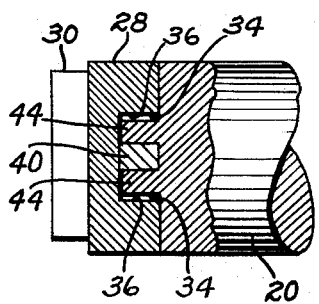
Fig. 3 is a sectional view.

Positioned within the slot 34 of the coupling driven member 28 is the driving member 26 of the coupling 24, the driving member 26 being generally Z-shaped having a web 40 and oppositely directed legs or abutments 42. As shown, the abutments 42 are provided respectively on the outer opposite ends of the web 40 and extend laterally from opposite sides of the web to abut, respectively, the walls 36, providing a positive drive connection between coupling members 26 and 28. Also, the abutments 42 space the web 40 from both of the walls 36, the web being positioned midway between walls 36 in the plane of the axis of rotation of the shaft components. The positive drive connection is in the direction indicated by the arrow, Fig. 2. The coupling member 26 is connected to the driving shaft component 20 by a pair of spaced lugs 44 that are formed on the end of component 20 and spaced apart to receive the web 40 of the coupling therebetween. As shown in Fig. 3, the web 40 has a close fit between the driving lugs 44 to avoid relative movement therebetween, and the lugs 44 are spaced from the walls 36 to allow for continued limited rotation of the driven coupling 28 after the driving coupling stops.

Bonded to opposite sides of the web 40 and to the adjacent walls 36 of coupling member 28 is a pair of resilient cushions or rubber blocks 46. As shown, the rubber blocks 46 are diametrically disposed on opposite sides, respectively, of the web 40 adjacent abutments 42. The rubber blocks 46 are preferably of soft rubber and on assembly are displaced between the web 40 and the walls 36 of coupling member 28 such that normally the rubber blocks under compression act to hold the ends of the abutments 42 in contact respectively with the walls 36 of coupling member 28.

In operation, it will be seen that the Z-shaped driving member 26 of the coupling 24 provides a positive drive with coupling member 28 by engagement of the abutments 42 with walls 36 so that there will be no lag of shaft component 22 behind shaft components 20 when power is applied to the driving shaft component 20. However, when the driving operation stops, it will be seen that shaft component 22 will overtravel by displacing the rubber blocks 46, thus cushioning the momentum of the load on shaft 22 which otherwise would tend to sheer the shaft.

While I have shown and described my improved coupling in considerable detail, it will be understood that many variations thereof may be made without departing from the spirit and scope of the claims.

What I claim is:

1. A coupling for connecting a pair of rotary shaft components together comprising, a driven coupling member having a bifurcated end forming spaced opposed walls and having an axis of rotation parallel with and substantially midway between said opposed walls, a rotatable driving member positioned between the opposed walls of the bifurcated end of said driven member, said driving member having a web spaced from both of said walls and having oppositely directed abutments diametrically oppositely disposed and respectively engaging said walls outwardly of the axis of rotation of said driven member, and a pair of cushion members interposed between said opposed walls and said web yieldingly opposing rotation of said driven member upon discontinuation of operation of said driving member.

2. A coupling for connecting a pair of rotary shaft components together comprising, a driven coupling member having a bifurcated end forming spaced opposed walls on opposite sides of the axis of rotation of said member, a Z-shaped driving member positioned between said opposed walls having the ends of the legs of the Z respectively engaging said opposed walls and the web spaced therefrom, and a pair of resilient members disposed on opposite sides of said web between said web and said opposed walls yieldingly urging the ends of said legs respectively against said opposed walls.

3. A coupling for connecting a pair of rotary shaft components together comprising, a rotatable driven member having a slot in one end transverse to the axis of rotation of said member, a Z-shaped driven member positioned in said slot with the web of the Z spaced from the opposed walls of the slot and the ends of the oppositely directed legs of the Z respectively engaging the opposed walls of the slot, and a pair of resilient cushion members respectively positioned on opposite sides of the web of said drive member and outwardly of the axis of rotation thereof.

4. A coupling for connecting a pair of rotary shaft components together comprising, a rotatable driven member having a bifurcated end providing spaced opposed walls, a driving member disposed between the walls of the bifurcation including a web having an axis of rotation parallel thereto and to said opposed walls, oppositely directed legs on said web on opposite sides of the axis of rotation and respectively abutting said walls to drive the driven member in one direction only, and a pair of displaceable cushion members bonded respectively to opposite sides of said web and to said opposed walls adjacent said legs.

References Cited in the file of this patent

UNITED STATES PATENTS 2,004,077     McCartney et al. _____ June 4, 1935